United States Patent
Ament et al.

(10) Patent No.: US 6,293,092 B1
(45) Date of Patent: Sep. 25, 2001

(54) NOX ADSORBER SYSTEM REGENERATION FUEL CONTROL

(75) Inventors: Frank Ament, Troy; David Brian Brown, Brighton; David Allen Frank, Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/389,172

(22) Filed: Apr. 12, 1999

(51) Int. Cl.[7] ..................................................... F01N 3/00
(52) U.S. Cl. ............................. 60/274; 60/295; 60/286; 60/297; 60/285
(58) Field of Search ........................... 60/274, 276, 295, 60/297, 301, 285, 277, 286

(56) References Cited

U.S. PATENT DOCUMENTS

| | | | |
|---|---|---|---|
| 5,437,153 | * | 8/1995 | Takeshima et al. ............... 60/276 |
| 5,743,084 | * | 4/1998 | Hepburn ............................ 60/274 |
| 5,771,685 | * | 6/1998 | Hepburn ............................ 60/274 |
| 5,771,686 | * | 6/1998 | Pischinger et al. ............... 60/274 |
| 5,901,553 | * | 5/1999 | Cullen .............................. 60/274 |
| 5,974,788 | * | 11/1999 | Hepburn et al. ................. 60/274 |
| 5,983,627 | * | 11/1999 | Asik ................................. 60/274 |
| 6,023,929 | * | 1/2000 | Ma ................................... 60/295 |

* cited by examiner

Primary Examiner—Thomas Denion
Assistant Examiner—Binh Tran
(74) Attorney, Agent, or Firm—Anthony Luke Simon

(57) ABSTRACT

A method for controlling regeneration fuel supplied to an internal combustion engine operating with a lean fuel-air mixture during sequential rich mixture regeneration events of a NOx adsorber in which NOx emissions collected by the adsorber are purged to provide optimum emissions control and minimum fuel consumption. The method monitors the exhaust gases flowing out of the adsorber during the regeneration event to detect when fuel-air mixture to the engine is within an excessively lean or rich range. When the sensed exhaust gases contain an excessively lean fuel-air mixture, fuel is increased to the engine. Fuel is decreased when the sensed exhaust gases contain an excessively rich fuel-air mixture. The fuel can be increased or decreased by adjusting the duration or fuel rate of the regeneration event.

6 Claims, 3 Drawing Sheets

NOX ADSORBER SYSTEM REGENERATION FUEL CONTROL

TECHNICAL FIELD

This invention relates to the control of an internal combustion engine and, more particularly, to the control of regeneration fuel supplied to an internal combustion engine during sequential regeneration events of a NOx adsorber to minimize engine emissions and maximize fuel economy.

BACKGROUND OF THE INVENTION

It is known in the art relating to internal combustion engines that by operating an engine with a less than stoichiometric (lean) mixture of fuel and air, efficiency of the engine is improved. This means that for a given amount of work performed by the engine, less fuel will be consumed, resulting in improved fuel efficiency. It is also well known that reduction of NOx emissions when the fuel rate is lean has been difficult to achieve, resulting in an almost universal use of stoichiometric operation for exhaust control of automotive engines. By operating an engine with a stoichiometric mixture of fuel and air, fuel efficiency is good and NOx emission levels are reduced by over 90% once the vehicle catalyst reaches operating temperatures.

Recent developments in catalysts and engine control technologies have allowed lean operation of the engine, resulting in improved fuel efficiency and acceptable levels of NOx emissions. One such development is a NOx adsorber which stores NOx emissions during fuel lean operations and allows release of the stored NOx during fuel rich conditions with conventional three-way catalysis to nitrogen and water. The adsorber has limited storage capacity and must be regenerated with a fuel rich reducing "pulse" as it nears capacity. It is desirable to control the efficiency of the regeneration event of the adsorber to provide optimum emission control and minimum fuel consumption.

SUMMARY OF THE INVENTION

The present invention is directed to a method for controlling NOx emissions from engines operating with lean fuel-air mixtures. The invention features a method for controlling regeneration fuel supplied to an internal combustion engine operating with a lean fuel-air mixture to obtain regeneration of a NOx adsorber to provide optimum emissions control and minimum fuel consumption. More specifically, the method monitors the exhaust gases flowing out of the adsorber during each regeneration event to detect when the fuel-air mixture is within an excessively lean or rich range. When the sensed exhaust gases contain an excessively lean fuel-air mixture, fuel is increased to the engine. Fuel is decreased when the sensed exhaust gases contain an excessively rich fuel-air mixture. The fuel can be increased or decreased by adjusting the duration or fuel rate of the regeneration event.

These and other features and advantages of the invention will be more fully understood from the following description of a certain specific embodiment of the invention taken together with the accompanying drawings.

BRIEF DESCRIPTION OF THE DRAWINGS

The invention may be best understood by reference to a preferred embodiment and to the drawings in which.

DESCRIPTION OF THE PREFERRED EMBODIMENT

Figure 1:
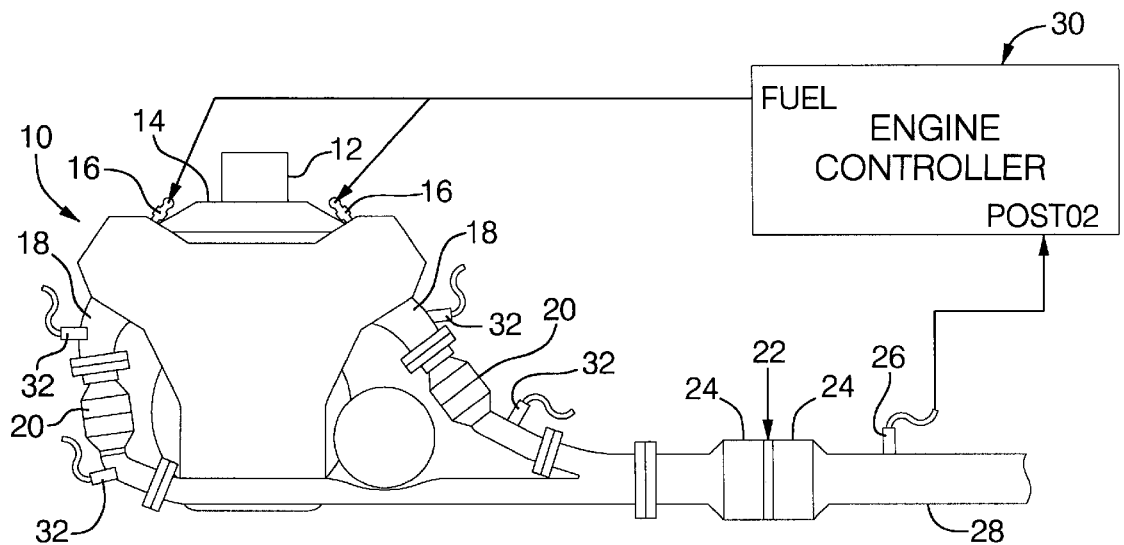
FIG. 1 is a general diagram of an engine and engine control hardware for carrying out this invention in accordance with the preferred embodiment.

Referring to FIG. 1, an internal combustion engine 10 receives intake air through an intake 12 to an intake manifold 14 for distribution to engine cylinder intake air runners (not shown). Electronically-controlled fuel injectors 16 are disposed in the engine for metering fuel thereto for mixing with the intake air to form fuel-air mixtures. The mixtures are then burned in engine cylinders (not shown).

Exhaust gases produced in the engine cylinder combustion process flow out of engine cylinders and through one or more exhaust gas conduits 18. A catalytic device 20 is connected in each exhaust gas conduit 18 to treat or clean the exhaust gases. From the catalytic device 20, the exhaust gases pass through a NOx adsorber 22 including two elements 24. A sensor 26 is disposed within a tailpipe 28 for monitoring the concentration of available oxygen in the exhaust gases and providing an output voltage signal POSTO2 which is received and analyzed by an engine controller 30. The controller 30 determines whether the regeneration event of the adsorber 22 is operating at an optimum point where emissions and fuel consumption are minimal and, if it is not, the controller makes the necessary adjustments to the fuel supply.

The function of the NOx adsorber 22 is to reduce engine produced NOx emissions when the engine 10 is fueled with a less than stoichiometric fuel rate, and allow the engine 10 to run lean and within acceptable emission levels. The adsorber 22 reduces NOx emissions by storing the NOx emissions for a limited time period of approximately 30 to 180 seconds. The stored NOx emissions are purged, when the adsorber 22 nears its storage capacity, by running the engine 10 fuel rich for approximately one to three seconds. This provides the necessary reductants in the form of HC and CO. When the fuel rich stream reaches the adsorber 22, the stored NOx emissions are released and chemically reduced to harmless nitrogen and water by conventional three-way catalysis within the NOx adsorber 22. To maintain minimal emission levels, it is necessary that the proper amounts of reductant be supplied to the adsorber 22 to reduce the stored NOx emissions. Insufficient amounts of reductant result in NOx emissions escaping from the adsorber 22, while too much reductant results in increased emissions of HC and CO and a loss in fuel efficiency. If desired, an additional three-way catalyst may be added downstream from the sensor 26 to further treat the outgoing exhaust gases.

In a preferred embodiment, the sensor 26 is a conventional oxygen sensor like sensors 32 commonly used before and after the catalytic devices 20 in the engine exhaust system. Sensor 26 is placed at the output of the adsorber 22 to produce the output voltage signal POSTO2 indicating the richness or leanness of the fuel-air mixture. When too little reductant has been supplied to the adsorber 22 to adequately purge the stored NOx emissions, the oxygen sensor 26 will produce an output signal having a voltage below a predetermined low voltage level, indicating a lean or mostly lean condition during the regeneration event. Conversely, when too much reductant has been supplied to the adsorber 22, the oxygen sensor 26 will produce an output signal having a voltage above a predetermined low voltage level, indicating an excessively rich condition during the regeneration event, thus indicating that HC and CO emissions are less than optimum and fuel is being wasted.

The engine controller 30 receives the output voltage signal POSTO2 from the sensor 26 and analyzes it to determine the status of the fuel-air mixture. The controller 30 may be a conventional microcontroller which includes such elements as a central processing unit CPU with an arithmetic logic unit ALU, read only memory ROM devices, random access memory RAM devices, input/output control circuitry I/O, and analog to digital conversion circuitry A/D. The controller 30 is activated upon manual application of ignition power to an engine by an engine operator. When activated, the controller 30 carries out a series of operations stored in an instruction-by-instruction format in ROM for providing engine control, diagnostic and maintenance operations. One such operation is a fuel control operation for generating and issuing to a fuel control module (not shown) a fuel command FUEL in the form of a pulse width corresponding to a desired fuel injector open time during which fuel is delivered to the cylinders for mixing with the intake air. The amount of the fuel supplied to the engine affects the efficiency of engine operation resulting from the regeneration event of the adsorber. The controller analyzes the output signal POSTO2 and determines whether the exhaust gases contain a fuel-air mixture that is within a desired range or has reached an excessively lean or rich range. If fuel-air mixture is not within the desired range, the fuel command FUEL is modified to obtain the desired range.

Figure 2:
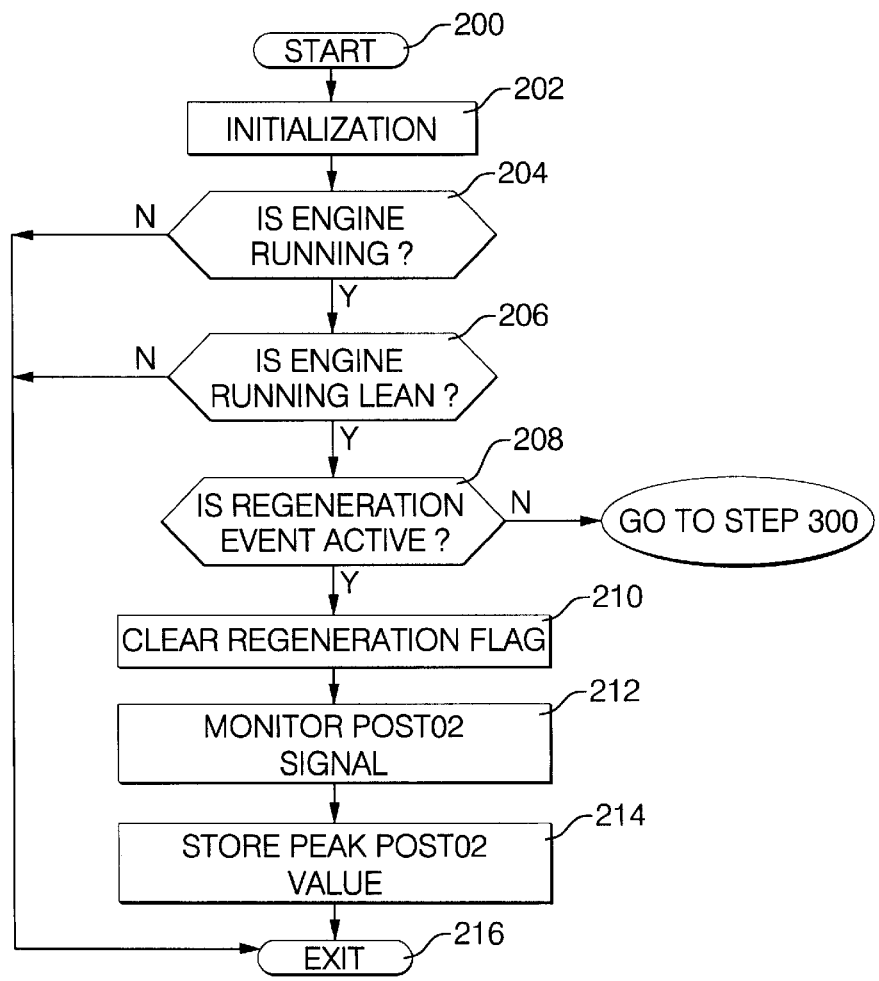
FIGS. 2 and 3 are computer flow diagrams illustrating a flow of operations for carrying out a method of this invention using the hardware of FIG. 1.

Generally, this procedure provides for fuel control to the adsorber during sequential regeneration events and lean burn engine operations to minimize emissions and fuel consumption. More specifically, such an operation is initiated at step 200 in FIG. 2 upon application of ignition power to a previously inactive controller by the engine operator and proceeds from step 200 to carry out general initialization operations at a next step 202. Such initialization operations include setting pointers, flags, registers and RAM variables to their starting values. These starting values could be predetermined or learned and stored from previous operating regeneration events such that they can be used for the next regeneration event without having to relearn from a pre-established baseline.

Following general initialization operations, the engine is checked to see whether it is running and whether it is running lean in steps 204 and 206. If the engine is not running lean, the operation is exited at a step 216, but if it is running lean, then the operation proceeds to a step 208 where it is determined whether a regeneration event is active. If a regeneration event is taking place, then a regeneration flag is cleared at step 210. The output voltage signal POSTO2 is monitored and the peak voltage level of the signal is stored in RAM at steps 212 and 214.

Figure 3:
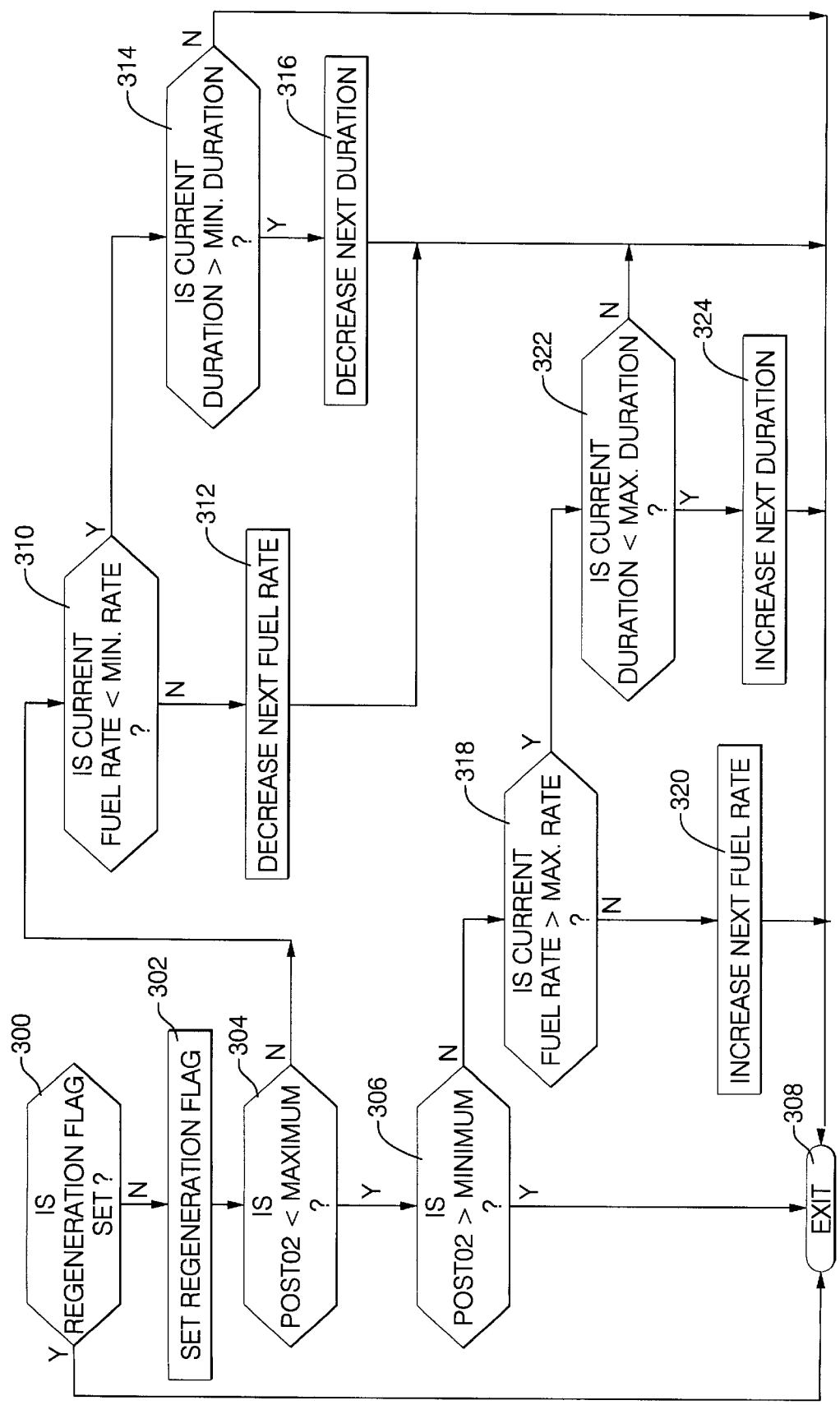
Figure 4A:
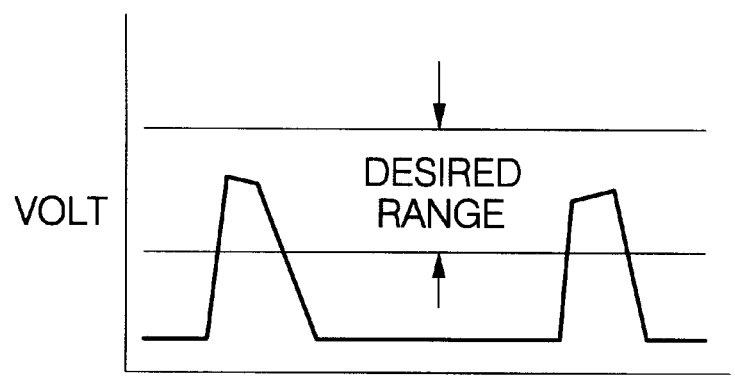
FIGS. 4A, 4B and 4C are graphs illustrating an output signal indicating the richness or leanness of the exhaust gases flowing out of the adsorber.

After the regeneration event has passed and regeneration fuel is no longer being supplied to the adsorber, the stored output signal POSTO2 is analyzed by executing the operations in FIG. 3. Such operations are initiated at step 300 upon determining that the regeneration flag has not been set, indicating that the stored output signal POSTO2 has not been analyzed to determine the status of the fuel-air mixture of the exhaust gases. Next, the regeneration flag is set at step 302 and the stored output signal is compared to a predetermined high voltage level at a step 304. If the output signal is less than the high voltage level, the stored output signal is compared to a predetermined low voltage level at step 306. If the stored output signal is greater than the predetermined low voltage level as shown in FIG. 4A, no adjustment is needed to the fuel supply and the operation is exited at a step 308 until the next regeneration event.

Figure 4B:
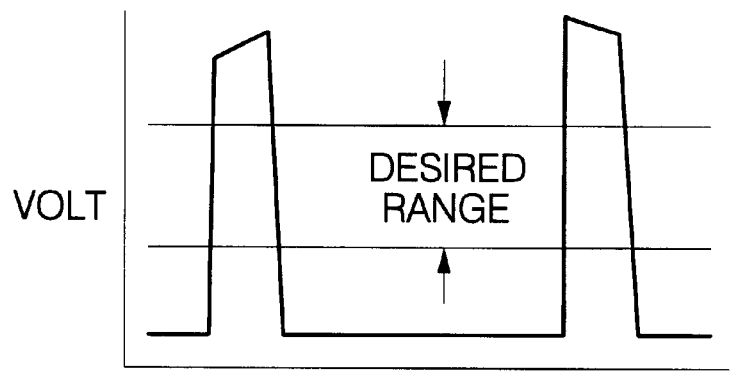

Returning to step 304, if the stored output signal is greater than the predetermined high voltage level as shown in FIG. 4B, then the last regeneration event has used too much fuel and the fuel supply should be adjusted accordingly. The fuel supplied to the engine may be adjusted by altering the fuel rate or the duration of the regeneration event. To determine whether the fuel rate or the duration of the regeneration event should be altered, steps 310–316 are executed. At a step 310, a present regeneration fuel rate is compared to a predetermined minimum fuel rate. If the present regeneration fuel rate is greater than the predetermined minimum fuel rate, then the next fuel rate is changed to a smaller fuel rate at a step 312 and the operation is exited at step 308 until the next regeneration event.

Returning to step 310, if the present regeneration fuel rate is equal to or less than the predetermined minimum fuel rate, then further reductions in the regeneration fuel rate are not acceptable; however, the duration of the regeneration event may be adjusted to alter the fuel supply to the engine. The present duration of the regeneration event is compared to a predetermined minimum regeneration event duration at a step 314. If the present duration is greater than the predetermined minimum duration, then the next regeneration event duration is reduced at a step 316 and the operation is exited at step 308 until the next regeneration event. If the present regeneration event duration is equal to or less than the minimum duration, no further adjustments to the regeneration fuel rate or duration are permitted and the operation is exited at step 308 until the next regeneration event.

Figure 4C:
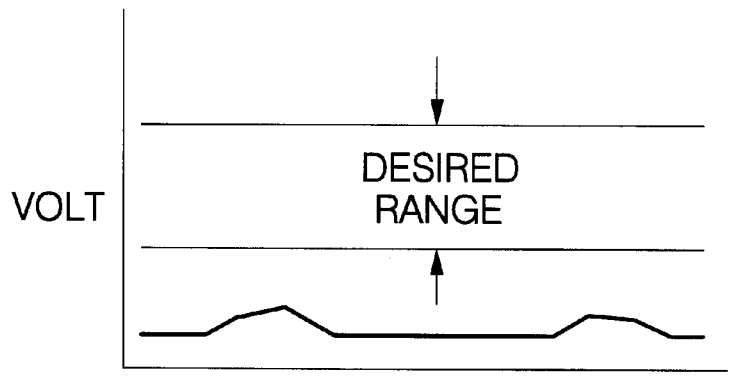

Returning to step 306, if the output signal POSTO2 is less than the predetermined low voltage level as shown in FIG. 4C, the regeneration fuel being supplied to the engine is inadequate and must be adjusted accordingly. The operation proceeds to a step 318 where the present regeneration fuel rate is compared to a predetermined maximum fuel rate. If the present regeneration fuel rate is less than the predetermined maximum fuel rate, the regeneration fuel rate is increased at a step 320 and the operation is exited at step 308. If the present regeneration fuel rate is greater than or equal to the maximum fuel rate, then further increase in the fuel rate is unacceptable; however, the duration of the regeneration event may be adjusted to supply more fuel to the engine. The present regeneration event duration is compared to a predetermined maximum regeneration event duration at a step 322. If the present duration is less than the predetermined maximum regeneration event duration, then the next generation event duration is increased at a step 324 and the operation is exited at step 308 until the next regeneration event. If the present regeneration event duration is greater than or equal to the maximum regeneration event duration, then no further adjustments in regeneration fuel rate or duration are permitted. The operation is exited at step 308 until the next regeneration event.

The method of the present invention provides an "adaptive" regeneration fuel control to optimize HC, CO and NOx conversion efficiency while minimizing fuel consumption. This method finds the best regeneration operating point while compensating for changes in the engine control system, fuel properties and catalyst activity.

While the invention has been described by reference to a certain preferred embodiment, it should be understood that numerous changes could be made within the spirit and scope of the inventive concepts described. Accordingly it is intended that the invention not be limited to the disclosed embodiment, but that it have the full scope permitted by the language of the following claims.

What is claimed is:

1. A method for controlling regeneration fuel supplied to an internal combustion engine operating with a lean fuel-air mixture during sequential rich mixture regeneration events of a NOx adsorber in which NOx emissions collected by the adsorber are purged, comprising the steps of:

monitoring exhaust gases flowing out of the adsorber during a regeneration event to detect when a fuel-air mixture is within an excessively lean or rich range;

increasing the fuel to the engine during a regeneration event following the first-recited regeneration event when the monitored exhaust gases contain an excessively lean fuel-air mixture; and decreasing the fuel to the engine during said regeneration event following the first-recited regeneration event when the monitored exhaust gases contain an excessively rich fuel-air mixture, wherein the step of increasing the fuel to the engine is accomplished by increasing fuel rate to the engine and the step of decreasing the fuel rate to the engine is accomplished by decreasing fuel rate to the engine.

2. A method for controlling regeneration fuel supplied to an internal combustion engine during sequential rich mixture regeneration events of a NOx adsorber in which NOx emissions collected by an adsorber are purged, comprising the steps of:

detecting vehicle engine operation with a lean fuel-air mixture;

detecting a present regeneration event of the adsorber;

sampling an output signal of an oxygen sensor downstream of the NOx adsorber indicating a relative richness or leanness of an air-fuel mixture downstream of the NOx adsorber during the present regeneration event;

storing a peak value of the output signal;

comparing the stored peak value to a predetermined high value;

comparing the stored peak value to a predetermined low value;

decreasing fuel to the engine during a next regeneration event when the stored peak value is more than the predetermined high value; and increasing fuel to the engine during the next regeneration event when the stored peak value is less than the predetermined low value.

3. A method as in claim 2 wherein the step of decreasing the fuel to the engine includes the steps of:

comparing a present regeneration fuel rate to a predetermined minimum fuel rate;

decreasing a next fuel rate for the next regeneration event when the present regeneration fuel rate is greater than the predetermined minimum fuel rate;

comparing a present regeneration event duration to a predetermined minimum regeneration event duration when the present regeneration fuel rate is less than or equal to the predetermined minimum fuel rate; and decreasing a next regeneration event duration when the present regeneration event duration is greater than the predetermined minimum regeneration event duration.

4. A method as in claim 2 wherein the step of increasing the fuel to the engine includes the steps of:

comparing a present regeneration fuel rate to a predetermined maximum fuel rate;

increasing a next fuel rate for a next regeneration event when the present regeneration fuel rate is less than the predetermined maximum fuel rate;

comparing a present regeneration event duration to a predetermined maximum regeneration event duration when the present regeneration fuel rate is greater than or equal to the predetermined maximum fuel rate; and increasing a next regeneration event duration when the present regeneration event duration is less than a predetermined maximum regeneration event duration.

5. A method as in claim 2 wherein the output signal is produced by a sensor for sensing when the exhaust gases flowing out of the adsorber contain an excessively lean or rich fuel-air mixture.

6. A method as in claim 5 wherein the sensor is an oxygen sensor.

* * * * *